(12) United States Patent
Bahirat et al.

(10) Patent No.: US 6,898,051 B2
(45) Date of Patent: May 24, 2005

(54) DISC DRIVE SPINDLE MOTOR HAVING A DAMPER ON A BOTTOM SURFACE OF THE SPINDLE MOTOR

(75) Inventors: Shirish Dnyaneshware Bahirat, Longmont, CO (US); David Ray Lapp, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 157 days.

(21) Appl. No.: 10/126,204

(22) Filed: Apr. 19, 2002

(65) Prior Publication Data

US 2003/0099061 A1 May 29, 2003

Related U.S. Application Data

(60) Provisional application No. 60/333,703, filed on Nov. 27, 2001.

(51) Int. Cl.[7] .......................... G11B 33/08; G11B 17/02
(52) U.S. Cl. .................... 360/99.08; 360/97.02
(58) Field of Search ................ 360/98.07, 99.08, 360/99.04, 97.01, 97.02, 97.03, 98.01

(56) References Cited

U.S. PATENT DOCUMENTS

| | | | |
|---|---|---|---|
| 4,604,665 A | 8/1986 | Muller et al. ............ 360/97.02 |
| 4,647,803 A | 3/1987 | Von der Heide et al. ..... 310/51 |
| 5,214,549 A * | 5/1993 | Baker et al. ............ 360/97.02 |
| 5,483,397 A | 1/1996 | Gifford et al. ........... 360/97.01 |
| 5,666,239 A | 9/1997 | Pottebaum .............. 360/97.03 |
| 5,694,268 A | 12/1997 | Dunfield et al. ......... 360/98.07 |
| 5,757,580 A | 5/1998 | Andress et al. .......... 360/97.02 |
| 5,770,133 A * | 6/1998 | Boutaghou ................. 264/135 |
| 5,781,373 A | 7/1998 | Larson et al. ............ 360/97.02 |
| 5,822,150 A * | 10/1998 | Kelsic ..................... 360/98.07 |
| 5,934,107 A * | 8/1999 | Lee et al. ..................... 68/3 R |
| 6,104,114 A | 8/2000 | Takeda et al. ................ 310/90 |
| 6,175,469 B1 | 1/2001 | Ahmad et al. ........... 360/97.02 |
| 6,204,996 B1 | 3/2001 | MacLeod ................. 360/99.08 |
| 6,249,400 B1 * | 6/2001 | Hong et al. .............. 360/97.02 |
| 6,288,866 B1 * | 9/2001 | Butler et al. ............. 360/97.01 |
| 6,373,654 B1 * | 4/2002 | Iwahara et al. .......... 360/97.01 |
| 6,456,454 B1 * | 9/2002 | Slezak ..................... 360/97.03 |
| 6,473,263 B2 * | 10/2002 | Jang et al. ............... 360/97.01 |
| 6,498,700 B2 * | 12/2002 | Takahashi et al. ....... 360/97.01 |
| 6,505,807 B1 * | 1/2003 | Nolting et al. .............. 248/638 |
| 6,510,021 B1 * | 1/2003 | Woldemar et al. ....... 360/97.01 |
| 6,536,555 B1 * | 3/2003 | Kelsic et al. ............... 181/207 |
| 6,567,265 B1 * | 5/2003 | Yamamura et al. ......... 361/685 |
| 2001/0045782 A1 * | 11/2001 | Lieu et al. ................ 310/67 R |
| 2002/0044374 A1 * | 4/2002 | Hirasaka et al. ......... 360/97.01 |
| 2002/0071201 A1 * | 6/2002 | Jang et al. ............... 360/97.01 |

FOREIGN PATENT DOCUMENTS

| | | | |
|---|---|---|---|
| JP | 6-295576 A | * | 10/1994 |
| JP | 8-171786 A | * | 7/1996 |
| JP | 2002-343015 A | * | 11/2002 |

* cited by examiner

*Primary Examiner*—Jefferson Evans
(74) *Attorney, Agent, or Firm*—Fish & Richardson P.C., P.A.

(57) ABSTRACT

A disc drive assembly includes a magnetic disc mounted on a hub of a spindle motor. The spindle motor includes a base portion supporting the hub for rotation about a spindle axis. A bottom surface of the base portion extends outside of an internal disc drive environment, and a damper affixed to the bottom surface of the base portion attenuates vibrations within the base portion of the spindle motor. A constrain layer of the damper is secured to the bottom surface of the base portion by an adhesive, and the constrain layer is sufficiently stiff to dampen resonant vibrations such as rocking mode vibrations.

21 Claims, 4 Drawing Sheets

DISC DRIVE SPINDLE MOTOR HAVING A DAMPER ON A BOTTOM SURFACE OF THE SPINDLE MOTOR

CROSS REFERENCE TO RELATED APPLICATION

This application claims the benefit of U.S. provisional application Ser. No. 60/333,703 filed Nov. 27, 2001, entitled "Motor Base Damper."

FIELD OF THE INVENTION

This application relates to magnetic disc drives and more particularly to a damper for reducing vibrations in a disc drive spindle motor.

BACKGROUND OF THE INVENTION

A computer disc drive includes one or more discs mounted on a hub for rotation about a spindle axis. The discs are typically coated with a magnetic medium for storage of digital information in a plurality of circular, concentric data tracks. A spindle motor rotates the hub and the attached discs to allow a head or "slider" carrying electromagnetic transducers to pass over each disc surface and read information from or write information to the data tracks.

The slider is typically formed from a ceramic block having a specially etched surface that forms an air "bearing" as the disc rotates beneath the slider. The lifting force provided by the air bearing surface causes the slider to lift off and "fly" a very small distance above the surface of the disc as the disc spins up to its operating speed. Although the fly height of the slider is only a fraction of a micron, this thin film of air between the slider and the disc prevents damage to the fragile magnetic coating on the surface of the disc.

The spindle motor commonly includes a fixed stator and a rotor that rotates with the hub and the attached discs about the spindle axis. The rotor/hub may alternatively rotate with a spindle shaft or the shaft may be stationary so that the rotor/hub rotates about the shaft. The stator continuously energizes the rotor to overcome wind resistance as well as friction in the spindle motor bearings as the rotor/hub spins at high speed.

A number of factors determine the speed at which data can be stored and read from the discs. These factors include the density of the data tracks on the discs as well as the speed of the spindle motor (i.e., the rotational speed of the discs). Indeed, it is highly desirable in the disc drive art to have high disc rotation speeds in order to reduce track access times. Typical spindle motor speeds include 7,200 revolutions per minute and beyond. However, increases in disc drive spindle motor speeds lead to increases in vibration levels of the entire disc drive which, in turn, increase head position errors caused by disc wobble or "non-repeatable run-out." The increased vibration levels also lead to undesirably high acoustic levels emanating from the operating drive.

Disc drive spindle motors are subject to a variety of different vibration sources, including environmental sources as well as vibrations resulting from operation of the motor itself. Internal vibration sources include electromagnetic forces from the commutation pulses used to drive the rotor, as well as friction from the motor bearings and drag forces from the air passing over the rotating discs. Spindle motors, like all mechanical structures, are susceptible to certain natural resonant frequencies or "modes" where the vibration amplitude is increased due to the specific structural make-up of the motor. One of the most critical vibratory modes or resonant frequencies of a spindle motor is the "rocking" mode which leads to a rocking or wobbling displacement of the discs and the disc hub relative to the spindle axis. Indeed, rocking mode vibrations are believed to be a primary contributor to non-repeatable run-out.

Prior art disc drives offer minimal damping to attenuate rocking mode effects during operation of the drive. These undamped prior art drives suffer from relatively high amplitude vibrations at the rocking mode resonant frequencies. As noted above, large amplitude resonance vibrations lead to non-repetitive run-out which in turn causes track mis-registration. Of course, track mis-registration during a write operation can lead to data loss. Therefore, the ability of a disc drive spindle motor to reduce or absorb vibrations, and particularly rocking mode vibrations, has a significant impact on the performance of the drive (i.e., the ability of the drive to support high track and bit densities and fast spin rates) as well as the acoustic noise generated by the drive.

Accordingly, there is a need to reduce rocking mode vibrations in spindle motors to both increase the performance of the disc drive and reduce the acoustic level of the drive. The present invention provides a solution to this and other problems, and offers other advantages over the prior art.

SUMMARY OF THE INVENTION

The present invention relates to a disc drive spindle motor having a damper positioned on a base portion of the spindle motor for attenuating the amplitude of certain vibration modes (e.g., the rocking mode) experienced by the spindle motor during operation of the disc drive.

In accordance with one embodiment of the invention, a disc drive includes a magnetic disc mounted on a hub of a spindle motor. The spindle motor includes a base portion supporting the hub and the attached disc and for rotation about a spindle axis. A bottom surface of the base portion extends outside of an internal disc drive environment, and a damper affixed to the bottom surface of the base portion dampens or attenuates vibrations within the base portion of the spindle motor. The damper preferably includes a constrain layer and an adhesive layer securing the constrain layer to the bottom surface of the base portion. The constrain layer may be formed from metal or a similarly stiff material, and the damper covers substantially the entire bottom surface of the spindle motor base portion. When an electrical connector is secured to the bottom surface of the spindle motor, the damper is shaped to cover substantially the entire bottom surface of the spindle motor that is not covered by the electrical connector.

Another embodiment of the invention is a spindle motor for a disc drive that defines an internal environment for housing a magnetic disc. The spindle motor includes a base portion supporting a rotatable spindle hub adapted to support the magnetic disc. The base portion includes a bottom surface adapted to extend outside of the internal environment of the disc drive. A damper affixed to the bottom surface of the base portion attenuates or dampens vibrations within the base portion of the spindle motor.

The present invention can further be implemented as a disc drive including a spindle motor and a means for damping rocking mode vibrations of the spindle motor. The disc drive defines an internal environment for housing a rotating magnetic disc, and the damping means is positioned on a bottom surface of the spindle motor outside of the internal environment of the disc drive. The damping means preferably includes a constrain layer applied to the bottom surface of the spindle motor by an adhesive.

These and various other features as well as advantages which characterize the present invention will be apparent from a reading of the following detailed description and a review of the associated drawings.

DETAILED DESCRIPTION

Figure 1:
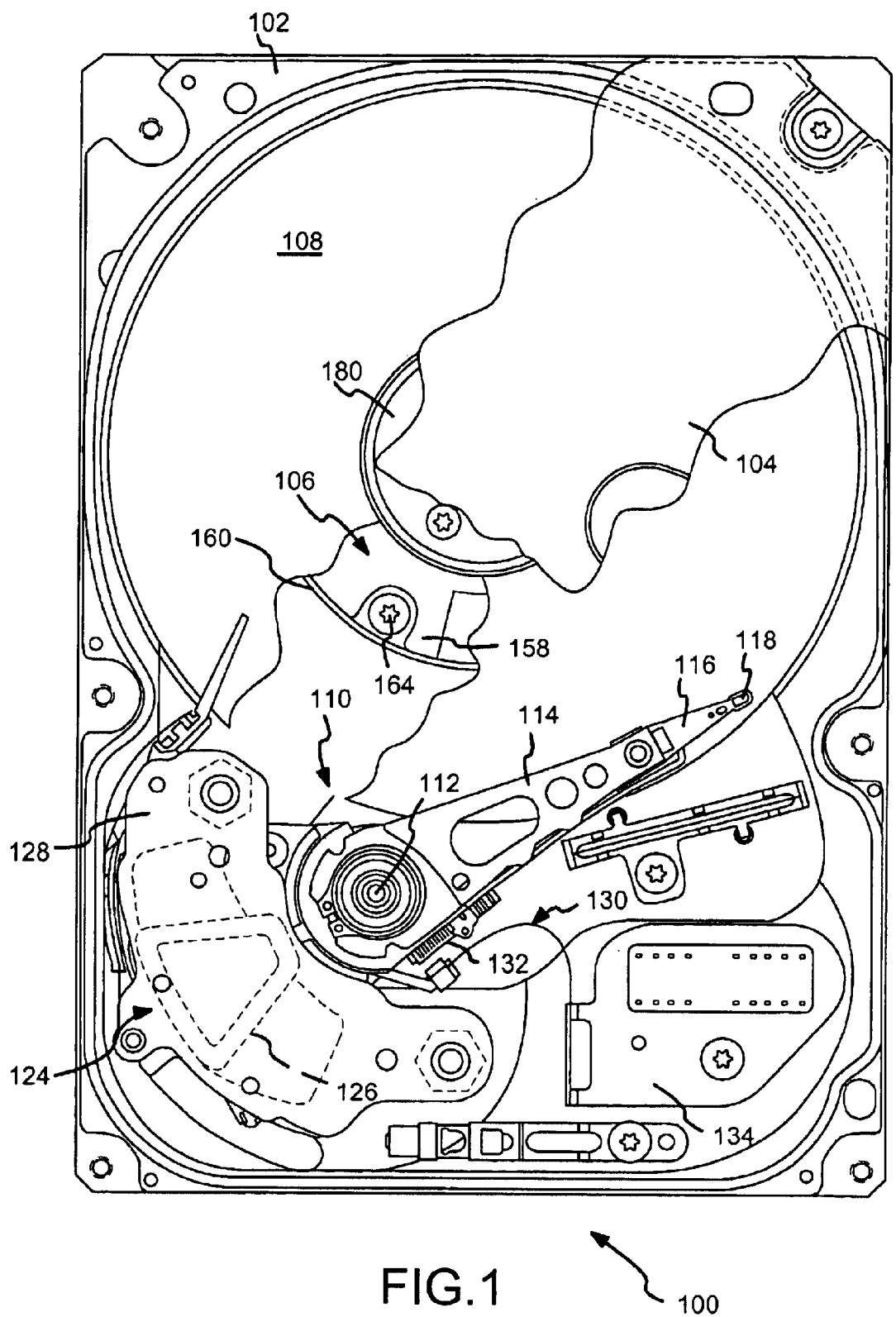
FIG. 1 is a perspective view of a disc drive with a portion cut away to illustrate a spindle motor in accordance with a preferred embodiment of the present invention.

A disc drive 100 constructed in accordance with a preferred embodiment of the present invention is shown in FIG. 1. The disc drivel 100 includes a base plate 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more suspensions or flexures 116 extending from each of the actuator arms 114. Mounted at the distal end of each suspension 116 is a head or "slider" 118 which includes an air bearing enabling the slider 118 to fly in close proximity above the corresponding surface of the associated disc 108.

The radial position of the slider 118 is controlled through the use of a voice coil motor 124, which typically includes a coil 126 attached to the actuator assembly 110, as well as one or more permanent magnets and return plates 128 which are spaced apart to establish a vertical magnetic field within which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the slider 118 is caused to move across the surface of the disc 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the suspensions 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base plate 102 to a disc drive printed circuit board assembly ("PCBA") 140 (FIG. 2) mounted to the bottom side of the disc drive base plate 102.

Figure 2:
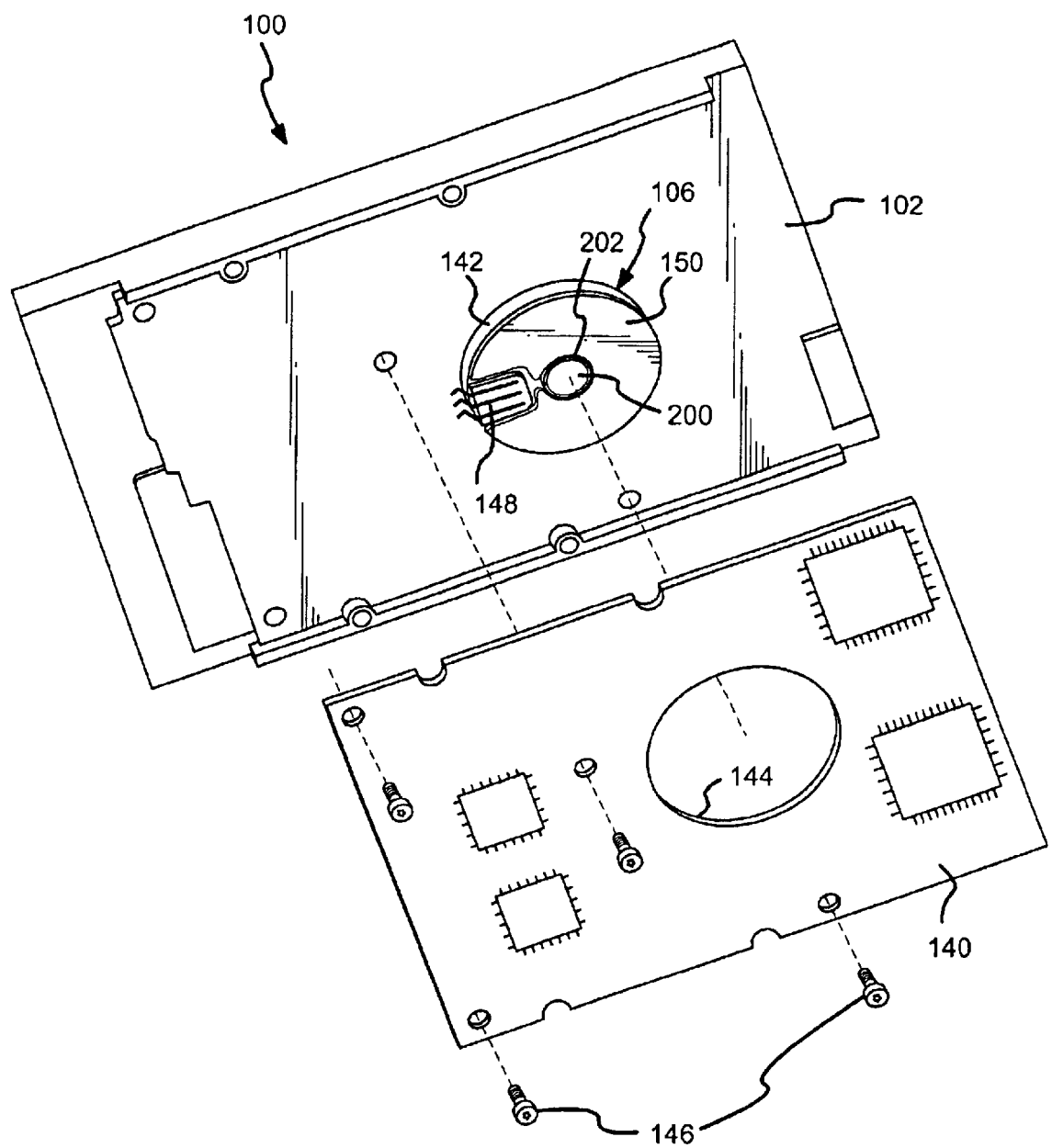
FIG. 2 is an exploded perspective view of a bottom side of the disc drive shown in FIG. 1 illustrating a printed circuit board separated from a base plate of the disc drive to show a spindle motor base having a damper in accordance with an embodiment of the present invention.

Referring now to FIG. 2, the bottom side of the drive base plate 102 is shown exploded away from the PCBA 140. The base plate 102 preferably includes an opening (not shown) for receiving a cylindrical base portion 142 which protrudes through the opening (not shown) and extends below the base plate 102 for electrical connection to the PCBA140. The PCBA 140 includes a circular through hole 144 for receiving the motor base 142 so that the PCBA 140 may be mounted flush against the bottom surface of the base plate 102. A plurality of screws 146 are used to secure the PCBA 140 to the base plate 102. A top surface of the PCBA 140 preferably includes a plurality of electrical pads (not shown) for engaging an electrical connector 148 mounted on the motor base 142 as shown in FIG. 2.

Figure 3:
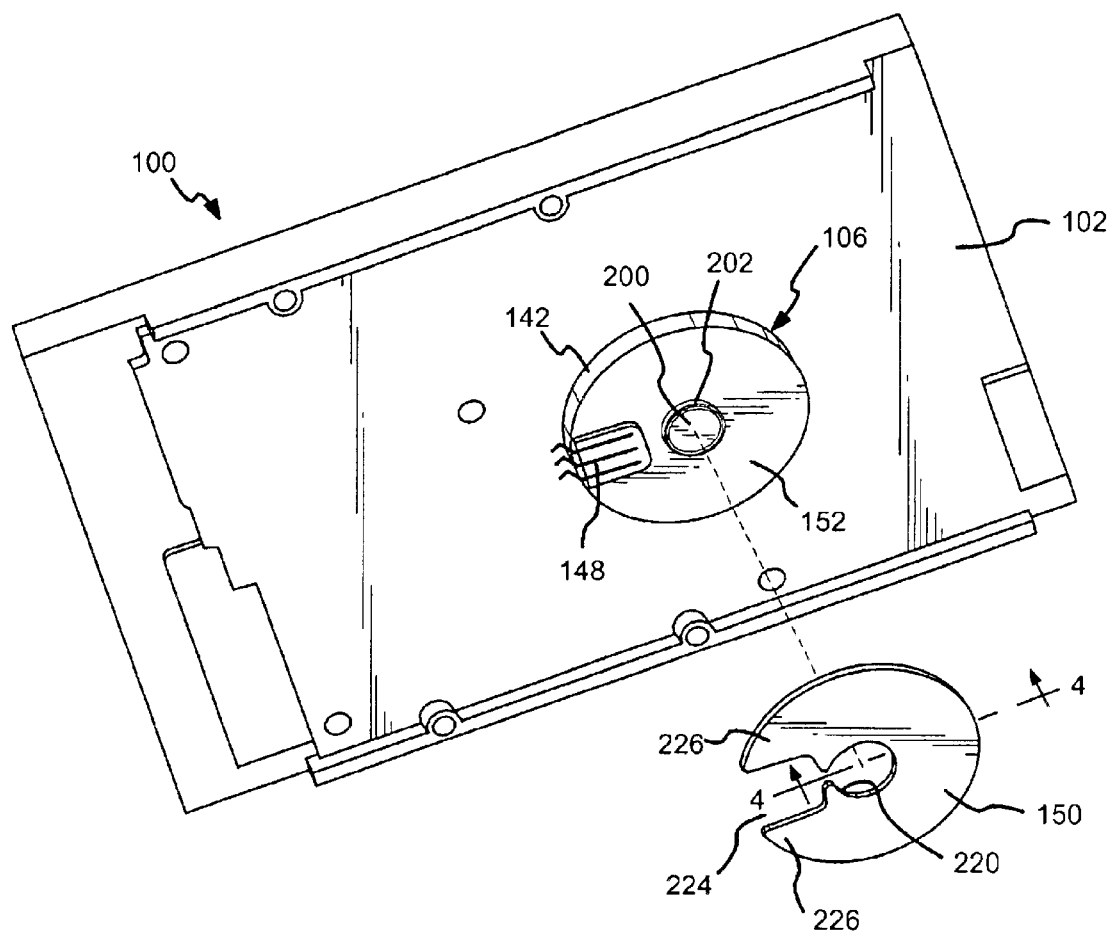
FIG. 3 is an exploded perspective view of the bottom side of the disc drive similar to FIG. 2 illustrating the damper separated from the bottom surface of the spindle motor base, and wherein the printed circuit board is deleted for purposes of clarity.
Figure 4:
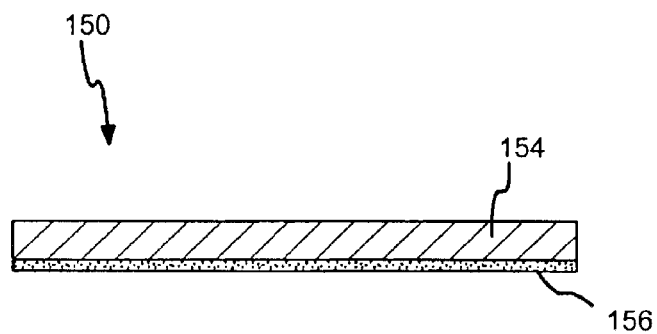
FIG. 4 is an enlarged section view of the spindle motor damper taken along the line 4—4 in FIG. 3.

FIG. 2 further illustrates a damper 150 according to one preferred embodiment of the present invention secured to a bottom surface 152 of the motor base 142. The damper 150 functions to reduce the amplitude of certain vibratory modes of the spindle motor 116 by damping or absorbing vibrations in the motor base 142, as described in greater detail below. The damper 150 is shown exploded from the bottom surface 152 of the motor base 142 in FIG. 3, and is shown in section view in FIG. 4.

Specifically, the damper 150 is shaped to fit around the contours of a spindle motor base 142 and essentially comprises a metal sheet or constrain layer 154 and an adhesive layer 156 (FIG. 4) for securing the constrain layer 154 to the bottom surface 152 of the motor base 142. In one preferred embodiment, the constrain layer 154 is preferably formed from cold rolled steel with a thickness of approximately 0.020 inches. However, one skilled in the art may substitute other similarly stiff materials and may alter the thickness of the constrain layer to provide a barrier against magnetic flux leakage as well as attenuate vibrations. The thickness and material of the constrain layer 154 may also be adjusted to reduce acoustic emissions from the spindle motor base 142, as described below. The adhesive layer 156 is preferably formed from a pressure sensitive adhesive having a uniform thickness to ensure a lack of air gaps between the constrain layer 154 and the bottom surface 152 of the motor base 142. However, because the damper 150 is situated outside of the sealed environment of the disc drive 100, the particular pressure sensitive adhesive used is not important since any outgassing from the adhesive will not impact drive performance.

Figure 5:
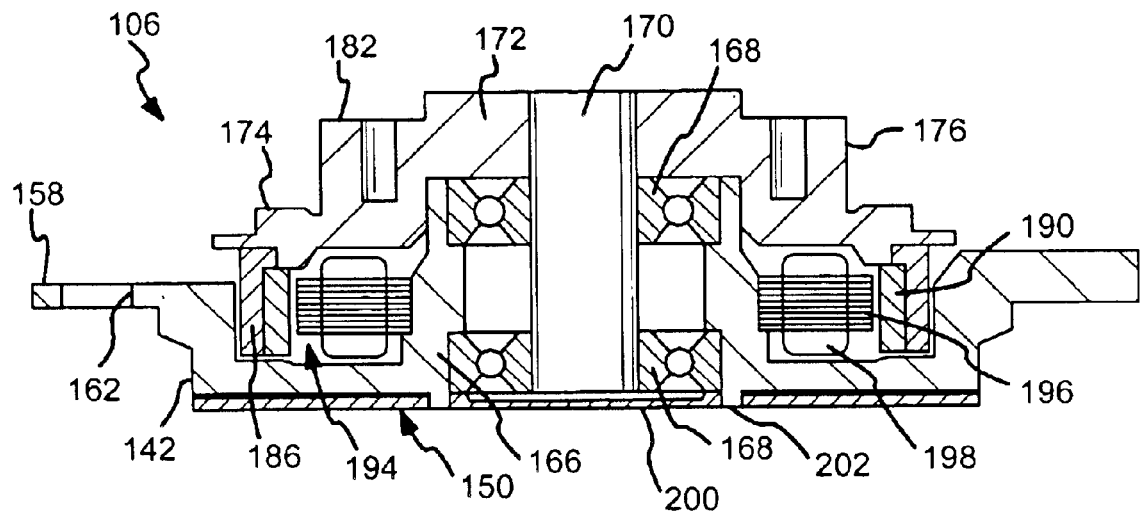
FIG. 5 is an enlarged sectional view through the disc drive spindle motor shown in FIGS. 1–3 illustrating a substantially flush mounting of the damper to a bottom surface of the spindle motor base.
Figure 6:
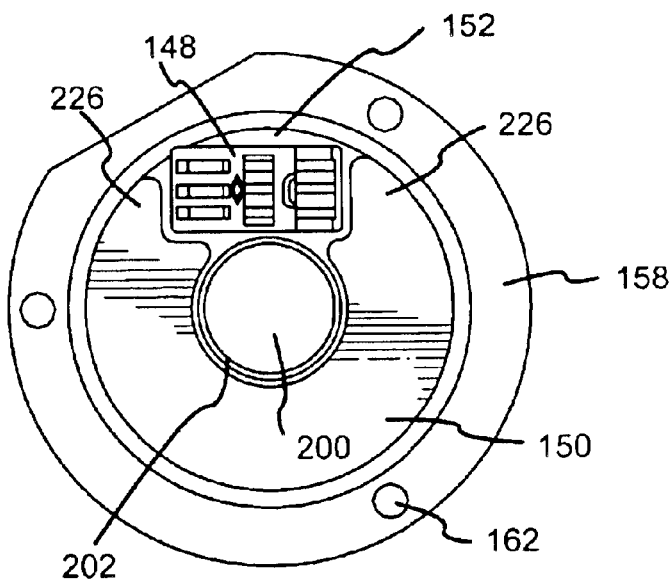
FIG. 6 is a bottom view of the spindle motor shown in FIG. 5 illustrating the damper affixed to the bottom surface of the spindle motor base.

FIGS. 5 and 6 illustrate a cross-sectional view and a bottom view, respectively, of the spindle motor 106 with the attached damper 150. The spindle motor 106 is illustrated separately from the base plate 102, the top cover 104 and the discs 108 for purposes of clarity. The cylindrical motor base 142 of the spindle motor is preferably formed integrally with an upper annular flange 158 that extends outwardly from the base 142. The annular flange 158 preferably fits within a recessed region 160 (FIG. 1) of the top surface of the disc drive base plate 102 once the motor base 142 has been extended through the opening (not shown) in the base plate 102. The annular flange 158 includes a plurality of through holes 162 (FIGS. 5 and 6) which mate with openings (not shown) in the base plate 102 so that screws 164 (FIG. 1) can secure the spindle motor 106 to the base pate 102.

The spindle motor base 142 includes a cylindrical wall or motor mount 166 extending upward as shown in FIG. 5. An inner cylindrical surface of the motor mount 166 supports an outer race of a pair of axially-spaced bearings 168, while the inner race of each bearing 168 is secured to a shaft 170 to provide rotation of the shaft 170 relative to the motor base 142. Thus, the embodiment of the spindle motor 106 shown in FIG. 5 is known as a "rotating shaft" spindle motor. A cylindrical shaped hub 172 extends radially outward from the shaft 170 and includes a bottom radial flange 174 and a cylindrical surface 176 extending upward from the flange 174 to support one or more discs 108 (FIG. 1). Once the discs 108 are loaded on the hub 172, a clamp ring 180 (FIG. 1) is attached to a top surface 182 of the hub 172 to secure the discs 108 to the hub so that the discs 108 rotate with the shaft 170.

An outer periphery of the hub 172 includes an annular wall or backiron 186 extending downward below the flange 174. A magnet 190 secured to an inner surface of the backiron 186 acts as a rotor for the spindle motor 106. Additionally, an outer cylindrical surface of the motor mount 166 preferably supports an inner surface of a stator 194 as shown in FIG. 5. The stator 194 is formed from a stack of stator laminations 196 and associated stator windings 198. Commutation pulses (timed direct current pulses) directed to sequentially selected stator windings are used to energize the rotor and thereby rotate the assembly of the shaft 170, the hub 172 and the attached discs 108 in a known manner.

A bearing cap or seal 200 extends across a bottom surface of the spindle motor base 142 as shown in FIG. 5 to prevent contamination of the bearings 168. The bearing cap 200 preferably comprises a metal disc that is thicker along an outer edge so that the bearing cap 200 engages the fixed outer race of the lower bearing 168 while not interfering with the rotating shaft 170 and the inner race of the lower bearing 168. In the embodiment shown in FIGS. 5 and 6, an outer circumferential edge of the bearing cap 200 abuts against an annular ring 202 protruding downward below the bottom surface 152 of the spindle motor base 142.

FIGS. 5 and 6 illustrate the connection of the damper 150 to the bottom surface 152 of the spindle motor base 142. In one embodiment shown in the drawing, the damper 150 includes a central opening 220 that allows the damper 150 to surround the bearing cap 200 and the ring 202 that surrounds the bearing cap 200. The damper 150 further preferably includes a circumferential opening 224 that defines two arms 226 on opposite sides of the opening 224. The arms 226 are preferably sized to fit closely about the electrical connector 148 mounted on the motor base 142, as best shown in FIG. 6. The shape of the damper 150 is selected so that the damper 150 covers the maximum possible surface area of the spindle motor base bottom surface 152, while still allowing for manufacturing and assembly tolerances.

As noted in FIG. 5, the bottom surface 152 of the spindle motor base 142 is preferably sculpted to receive the damper 150 in a flush manner, thereby forming a substantially level bottom of the spindle motor assembly. That is, the bearing cap 200 and the support ring 202 preferably extend a predetermined distance below the remainder of the bottom surface 152 of the spindle motor base 142, where the predetermined distance is preferably equal to a thickness of the damper 150 so that the installed damper 150 is substantially flush with the bearing cap 200. As noted above, one preferred embodiment of the constrain layer 154 of the damper 150 is approximately 0.020 inches. Therefore, the ring 202 and the bearing cap 200 preferably extend approximately 0.020 inches below the bottom surface 152 of the spindle motor base 142.

Contouring the shape of the damper 150 to cover substantially the entire open area of the bottom surface 152 of the motor base 142 provides maximum vibration damping effect. That is, by using a uniformly thick adhesive layer 156, the entire surface of the constrain layer 154 is in communication with substantially the entire bottom surface 152 of the motor base 142. In this manner, the constrain layer 154 provides maximum vibration damping or attenuation from the rocking mode and other vibrations transmitted to the spindle motor base 142. Indeed, experimental results have shown average reductions in non-repeatable run-out of 15–20 percent and, in some instances, reductions as high as 40 percent have been observed.

While the preferred embodiment of the damper 150 shown in the drawing is tailored to fit closely on the exemplary embodiment of a spindle motor 106 shown in FIG. 5, it is understood that the damper of the present invention will function equally well with other spindle motor types or configurations. For example, while the spindle motor 106 in FIG. 5 includes ball bearings 168 and a rotating shaft 170, those skilled in the art will understand that the damper 150 can be used on any type of spindle motor, including those with fixed shafts and/or with alternative bearings (such as fluid dynamic bearings) in place of the more traditional ball bearing 168. That is, any disc drive 100 having one or more rotating discs 108 will likely incur structural vibrations due to a wobble or "rocking motion" of the spindle motor. It is primarily this type of motor vibrations which the damper 150 is designed to attenuate. Of course, when the damper 150 is used with different spindle motors, the shape of the damper may be altered to conform to the bottom surface of the respective motor base. For example, fixed shaft spindle motors may not have a bearing cap 200 or may have a shaft anchor that is smaller in diameter than the cap 200 shown in the drawing. Thus, the central opening 220 of the damper 150 may be much smaller and, in some cases, there may be no central opening at all. Additionally, the size of the electrical connector 148 on the bottom of the spindle motor may differ with different types of spindle motors. Thus, the size of the circumferential opening 224 may also be altered as required to match the specific spindle motor.

Described in another way, a disc drive assembly (such as 100) in accordance with an exemplary preferred embodiment of the present invention has a base plate (such as 102) and a top cover (such as 104) that defines an internal drive environment housing a magnetic disc (such as 108) mounted on a spindle motor (such as 106) for rotation about a spindle axis. The spindle motor (such as 106) includes a hub (such as 172) for supporting the disc (such as 108), and further includes a base portion (such as 142) that supports the hub (such as 172) and includes a bottom surface (such as 152) that extends outside of the internal disc drive environment. The spindle motor (such as 106) further includes a damper (such as 150) affixed to the bottom surface (such as 152) of the base portion (such as 142) to dampen or attenuate vibrations within the base portion (such as 142) of the spindle motor (such as 106).

The damper (such as 150) preferably includes a constrain layer (such as 154) and an adhesive layer (such as 156)

securing the constrain layer (such as 154) to the bottom surface (such as 152) of the spindle motor base portion (such as 142). In one embodiment, the constrain layer (such as 154) may be formed from metal or a similarly stiff material. The damper (such as 150) covers substantially the entire surface area of the bottom surface (such as 152) of the base portion (such as 142) and, in those cases where an electrical connector (such as 148) is secured to the bottom surface (such as 152) of the spindle motor base portion (such as 142), the damper (such as 150) is preferably shaped to cover substantially the entire surface area of the base portion bottom surface (such as 152) that is not covered by the electrical connector (such as 148). Furthermore, when a protruding feature (such as 200) extends through the bottom surface (such as 152) of the spindle motor (such as 106), the damper (such as 150) includes a central opening (such as 220) to accommodate the feature (such as 200) and provide for flush contact between the damper (such as 150) and the bottom surface of the motor base (such as 142).

Another embodiment of the present invention may be described as a spindle motor (such as 106) for a disc drive (such as 100) that includes a base plate (such as 102) and a top cover (such as 104) defining an internal environment for housing a magnetic disc (such as 108). The spindle motor (such as 106) includes a base portion (such as 142) supporting a rotatable spindle hub (such as 172) adapted to support the magnetic disc (such as 108), wherein the base portion (such as 142) includes a bottom surface (such as 152) adapted to extend outside of the internal environment of the disc drive (such as 100). A damper (such as 150) affixed to the bottom surface (such as 152) of the base portion (such as 142) attenuates or dampens vibrations within the base portion (such as 142) of the spindle motor (such as 106).

Yet another embodiment of the present invention may be described as a disc drive (such as 100) including a spindle motor (such as 106) having a rotatable hub (such as 172) for supporting a magnetic disc (such as 108) and further including a means (such as 150) for damping rocking mode vibrations of the spindle motor (such as 106). The disc drive (such as 100) includes a base plate (such as 102) and a top cover (such as 104) defining an internal environment, and the damping means (such as 150) is preferably positioned on a bottom surface (such as 152) of the spindle motor (such as 106) outside of the internal environment of the disc drive (such as 100). The damping means (such as 150) preferably includes a constrain layer (such as 154) applied to the bottom surface (such as 152) of the spindle motor (such as 106) by an adhesive (such as 156).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, while the damper 150 is preferably formed from metal (e.g., cold rolled steel), it is understood that the damper 150 could be formed from alternative stiff materials (e.g., a stiff plastic material) that provide better damping characteristics than metal. Furthermore, it is understood that the damper 150 may be shaped for use with a variety of different spindle motors provided that the motor base 142 extends below the drive base plate 102 to provide a mounting surface for the damper 150. Indeed, the motor base 142 may be formed integrally with the base plate 102 rather than extending through an opening formed in the base plate. Accordingly, all such modifications, changes and alternatives are encompassed in the spirit of the invention disclosed and as defined in the appended claims.

What is claimed is:

1. A disc drive assembly having a base plate and a top cover defining an internal environment that contains a magnetic disc mounted on a spindle motor for rotation about a spindle axis, wherein the spindle motor comprises:
    a cylindrical hub supporting the disc;
    a base portion supporting the hub for rotation about the spindle axis, the base portion including a bottom surface extending outside of the internal environment of the disc drive assembly;
    an electrical connector secured to the bottom surface of the base portion; and
    a damper affixed to the bottom surface of the base portion to attenuate vibrations within the base portion of the spindle motor.

2. The disc drive assembly of claim 1, wherein the damper includes a constrain layer and an adhesive layer.

3. A disc drive assembly as defined in claim 2, wherein the constrain layer is formed from metal.

4. A disc drive assembly as defined in claim 2, wherein the constrain layer has a thickness of approximately 0.020 inches.

5. The disc drive assembly of claim 1, wherein the damper covers substantially the entire surface area of the bottom surface of the base portion that is not covered by the electrical connector.

6. The disc drive assembly of claim 1, wherein the electrical connector is adapted to connect the spindle motor to a printed circuit board.

7. The disc drive assembly of claim 1, wherein the damper is substantially disc shaped and includes a circumferential opening defining two opposing arms attached to the bottom surface of the spindle motors on opposite sides of the electrical connector.

8. The disc drive assembly of claim 1, wherein a feature of the spindle protrudes through a central point of the bottom surface of the base portion, and wherein the damper includes a central opening sized to fit around the protruding feature to allow the damper to be seated flush against the bottom surface of the base portion.

9. A disc drive assembly as defined in claim 8, wherein a spindle motor shaft rotates with the hub and the protruding feature is a bearing cap.

10. The disc drive assembly of claim 1, wherein said spindle motor further comprises an annular flange fastened to a top surface of the disc drive base plate.

11. A spindle motor for a disc drive, wherein the disc drive includes a base plate and a top cover defining an internal environment, comprising:
    a base portion supporting a rotatable spindle hub, the base portion including a bottom surface adapted to extend outside of the internal environment of the disc drive, wherein a feature of the spindle protrudes through a central point of the bottom surface of the base portion; and
    a damper affixed to the bottom surface of the base portion to attenuate vibrations within the base portion of the spindle motor.

12. The spindle motor of claim 11, wherein the damper comprises a constrain layer and an adhesive layer securing the constrain layer to the bottom surface of the spindle motor base portion.

13. The spindle motor of claim 11, wherein the damper covers substantially the entire surface area of the bottom surface of the base portion.

14. The spindle motor of claim 11, further comprising an electrical connector secured to the bottom surface of the base portion.

15. The spindle motor of claim 14, wherein the damper is substantially disc shaped and includes a circumferential opening defining two opposing arms attached to the bottom surface of the spindle motors on opposite sides of the electrical connector.

16. The spindle motor of claim 11, wherein the damper includes a central opening sized to fit around the protruding feature to allow the damper to be seated flush against the bottom surface of the spindle motor.

17. The spindle of claim 11, wherein the spindle motor shaft rotates with the hub and the protruding feature is a bearing cap.

18. A disc drive, comprising:
  a spindle motor having a rotatable hub for supporting a magnetic disc, wherein said spindle motor has a base portion including a bottom surface; and
  means for damping rocking mode vibrations of the spindle motor, wherein said means do not extend beyond the outer edges of the bottom surface.

19. The disc drive of claim 18, further comprising a base plate and a top cover defining an internal environment, and wherein the means for damping are positioned on a bottom surface of the spindle motor outside of the internal environment of the disc drive.

20. The disc drive of claim 18, wherein the means for damping includes a constrain layer applied to the bottom surface of the spindle motor by an adhesive.

21. The disc drive of claim 18, wherein said spindle motor comprises an electrical connector secured to the bottom surface of the base portion, and wherein said means for damping rocking mode vibrations comprise a damper which is substantially disc shaped and includes a circumferential opening defining two opposing arms attached to the bottom surface of the spindle motors on opposite sides of the electrical connector.

* * * * *